US009229027B2

(12) United States Patent
Moon

(10) Patent No.: US 9,229,027 B2
(45) Date of Patent: Jan. 5, 2016

(54) ATOMIC FORCE MICROSCOPY CONTROLLER AND METHOD

(75) Inventor: Christopher Ryan Moon, Cupertino, CA (US)

(73) Assignee: Keysight Technologies, Inc., Santa Rosa, CA (US)

(*) Notice: Subject to any disclaimer, the term of this patent is extended or adjusted under 35 U.S.C. 154(b) by 0 days.

(21) Appl. No.: 14/001,588

(22) PCT Filed: Feb. 25, 2011

(86) PCT No.: PCT/US2011/026191
§ 371 (c)(1),
(2), (4) Date: Aug. 26, 2013

(87) PCT Pub. No.: WO2012/115653
PCT Pub. Date: Aug. 30, 2012

(65) Prior Publication Data
US 2013/0333076 A1  Dec. 12, 2013

(51) Int. Cl.
G01Q 60/24 (2010.01)
B82Y 35/00 (2011.01)
G01Q 10/06 (2010.01)
G01Q 60/36 (2010.01)
G01Q 10/00 (2010.01)

(52) U.S. Cl.
CPC ............... *G01Q 60/24* (2013.01); *B82Y 35/00* (2013.01); *G01Q 10/00* (2013.01); *G01Q 10/065* (2013.01); *G01Q 60/363* (2013.01)

(58) Field of Classification Search
CPC ...... G01Q 10/065; G01Q 10/00; G01Q 60/22

USPC ........... 850/1, 2, 3, 4, 5, 7, 19, 20, 21, 33, 37, 850/38, 46, 47
See application file for complete search history.

(56) References Cited

U.S. PATENT DOCUMENTS

| 5,966,053 | A | * | 10/1999 | Durig et al. ............. 331/116 M |
| 5,986,381 | A | | 11/1999 | Hoen et al. |
| 8,291,510 | B2 | | 10/2012 | Schroeder et al. |
| 2009/0080107 | A1 | * | 3/2009 | Sebastian et al. ............... 360/75 |

(Continued)

FOREIGN PATENT DOCUMENTS

| JP | 05-134707 A | 1/1993 |
| JP | 2002540436 | 11/2002 |
| WO | WO0019166 A1 | 4/2000 |

(Continued)

OTHER PUBLICATIONS

International Preliminary Report on Patentability mailed Sep. 6, 2013 for International Application No. PCT/US2011/026191.

(Continued)

*Primary Examiner* — Nicole Ippolito
*Assistant Examiner* — Hanway Chang

(57) ABSTRACT

A method for determining a loop response for an apparatus for an atomic force microscope is disclosed. The method comprises: determining a loop response for an on-surface movement of a cantilever over a frequency range; determining a loop response for an off-surface movement of the cantilever over the frequency range; and adjusting an output of the controller at a frequency based on the loop response for the off-surface movement. An atomic force microscopy system is disclosed.

18 Claims, 9 Drawing Sheets

(56) References Cited

U.S. PATENT DOCUMENTS

2009/0261249 A1* 10/2009 Kobayashi et al. ........... 250/306
2010/0122385 A1   5/2010 Hu et al.

FOREIGN PATENT DOCUMENTS

| WO | WO0058759 A2 | 10/2000 |
| WO | 2008111433 | 9/2008 |
| WO | WO2010112440 A1 | 10/2010 |

OTHER PUBLICATIONS

International Search Report mailed Nov. 18, 2011 for International Application No. PCT/US2011/026191.
Office Action mailed Dec. 19, 2014 in Japanese Patent Application No. 2013-555405 (Unofficial/Non-certified translation provided by foreign agent included).
Notice of Allowance mailed Aug. 21, 2015 in Japanese Patent Application No. 2013-555405 (Unofficial/non-certified translation provided by foreign agent included).

* cited by examiner

ATOMIC FORCE MICROSCOPY CONTROLLER AND METHOD

BACKGROUND

An atomic force microscope (AFM) is a comparatively high-resolution type of scanning probe microscope. With demonstrated resolution of fractions of a nanometer, AFMs promise resolution more than 1000 times greater than the optical diffraction limit.

Many known AFMs include a microscale cantilever with a sharp tip (probe) at its end that is used to scan the specimen surface. The cantilever is typically silicon or silicon nitride with a tip radius of curvature on the order of nanometers. When the tip is brought into contact with a sample surface, forces between the tip and the sample lead to a deflection of the cantilever. One or more of a variety of forces are measured via the deflection of the cantilevered probe tip. These include mechanical forces and electrostatic and magnetostatic forces, to name only a few.

Typically, the deflection of the cantilevered probe tip is measured using laser spot reflected from the top of the cantilever and onto an optical detector. Other methods that are used include optical interferometry and piezoresistive AFM cantilever sensing.

One component of AFM instruments is the actuator that maintains the angular deflection of the tip that scans the surface of the sample. Most AFM instruments use three orthonormal axes to image the sample. The first two axes (e.g., X and Y axes) are driven to raster-scan the surface area of the sample with respect to the tip with typical ranges of 100 µm in each direction. The third axis (e.g., Z axis) drives the tip orthogonally to X and Y for tracking the topography of the surface.

Generally, the actuator for Z axis motion of the tip to maintain a near-constant deflection requires a comparatively smaller range of motion (e.g., approximately 1 µm (or less) to approximately 10 µm). However, as the requirement of scan speeds of AFMs increases, the actuator for Z axis motion must respond comparatively quickly to variations in the surface topography. In a contact-mode AFM, a feedback loop is provided to maintain the tip of a cantilever in contact with a surface. At high scan speeds and low force setpoints, however, the tip can detach from the surface, for example if the tip passes over a comparatively large depression in the surface. A cantilever that is off the surface of the sample (i.e., detached) can resonate at its natural resonant frequency. As the scan rate increases, the bandwidth of the controller must commensurately increase. This off-surface resonance can fall within the bandwidth of the feedback loop, which can amplify the resonance and cause the system to become unstable. Ultimately, this can damage samples and reduce the resolution of the images from the AFM.

There is a need, therefore, for a controller for an AFM and an AFM system that overcomes at least the shortcomings of known controllers discussed above.

SUMMARY

In a representative embodiment, a method for determining a loop response for an apparatus for an atomic force microscope is disclosed. The method comprises: determining a loop response for an on-surface movement of a cantilever over a frequency range; determining a loop response for an off-surface movement of the cantilever over the frequency range; and adjusting an output of the controller at a frequency based on the loop response for the off-surface movement.

In another representative embodiment, a computer readable medium having a computer readable program code embodied therein is disclosed. The computer readable program code is adapted to be executed to implement a method for determining a loop response for an apparatus for an atomic force microscope. The method comprises: determining a loop response for an on-surface movement of a cantilever over a frequency range; determining a loop response for an off-surface movement of the cantilever over the frequency range; and adjusting an output of the controller at a frequency based on the loop response for the off-surface movement.

In another representative embodiment, an atomic force microscopy (AFM) system comprises: a cantilever; a probe tip connected at a first end of the cantilever; an actuator connected to a second end of the cantilever; and a controller configured to: determine a loop response for an on-surface movement of a cantilever over a frequency range; determine a loop response for an off-surface movement of the cantilever over the frequency range; and adjust an output of the controller at a frequency based on the loop response for the off-surface movement.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DETAILED DESCRIPTION

Figure 1:
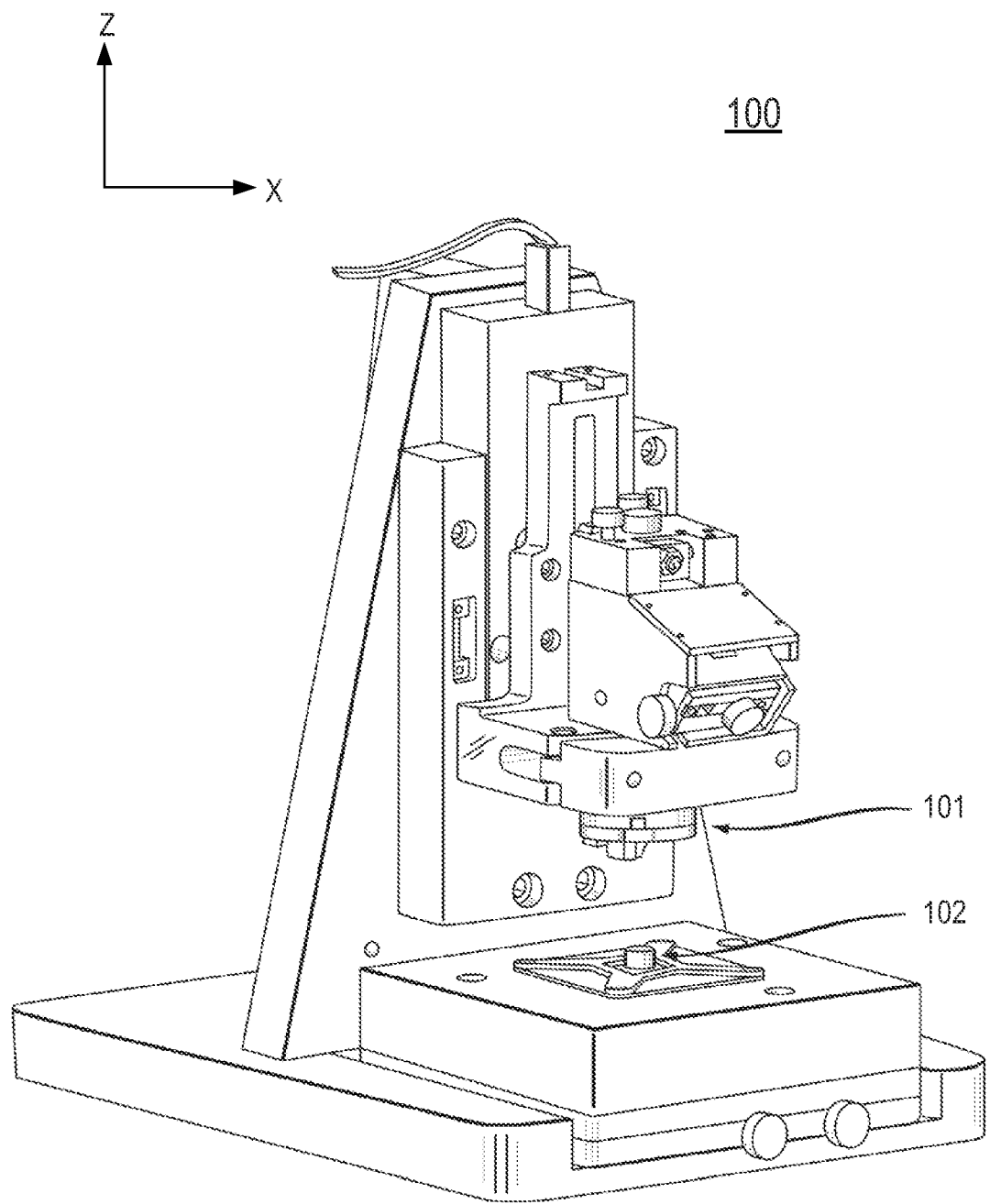
FIG. 1 is a perspective view of an apparatus for atomic force microscopy in accordance with a representative embodiment.

In the following detailed description, for purposes of explanation and not limitation, representative embodiments disclosing specific details are set forth in order to provide a thorough understanding of the present teachings. Descriptions of known devices, materials and manufacturing methods may be omitted so as to avoid obscuring the description of the example embodiments. Nonetheless, such devices, materials and methods that are within the purview of one of ordinary skill in the art may be used in accordance with the representative embodiments.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

It is to be understood that certain terminology defined herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms 'a', 'an' and 'the' include both singular and plural referents, unless the context clearly dictates otherwise. Thus, for example, 'a device' includes one device and plural devices.

As used in the specification and appended claims, and in addition to their ordinary meanings, the terms 'substantial' or 'substantially' mean to within acceptable limits or degree.

As used in the specification and the appended claims and in addition to its ordinary meanings, the term 'approximately' means to within an acceptable limit or amount to one having ordinary skill in the art.

As used herein, "physical system response" refers to a frequency response of the cantilever deflection when excited by an actuator connected to the cantilever.

As used herein, "controller response" refers to a designed frequency response of the controller that produces a voltage applied to an actuator in response to the deflection of the cantilever.

As used herein, "loop response" refers to the product of the physical system response and the controller response.

As used herein, "imaging response" refers to the response of a change in the height (z-direction of the coordinate system of FIG. 2) of the tip to a change in a height of a surface of a sample being measured. Ideally, the imaging response is 0 dB over a desired frequency range.

As described below, representative embodiments relate to a "contact-mode" AFM system (e.g., AFM system 200 described below) that exhibits one or more off-surface resonance conditions. It is emphasized that the present teachings are contemplated for application to "intermittent contact" and "non-contact" AFM systems that are susceptible to resonance conditions of a cantilever (e.g., cantilever 202 described below). For instance, certain AFM systems normally operate in the nominal off-surface regime but need to remain stable if the tip becomes captured by the surface, switching the system into an on-surface regime with altered dynamics. More generally, the present teachings contemplate measuring frequency responses over a frequency range, determining resonance conditions and mitigating the adverse impact of these resonance conditions through a controller of the AFM system.

FIG. 1 is a perspective view of an apparatus 100 for atomic force microscopy (hereinafter "AFM 100") in accordance with a representative embodiment. As will be readily appreciated by one of ordinary skill in the art, the present teachings are applicable to various types of AFMs, which may be known to some as scanning force microscopes (SFMs). The AFM 100 comprises many electrical and mechanical components, the discussion of which is outside the scope of the present teachings. The AFM 100 includes a probe assembly 101, certain components of which are described in connection with representative embodiments herein.

A sample 102 is maintained as shown for measurement and testing by the AFM 100. As described more fully herein, the sample 102 is generally moved in the x-y plane of the coordinate system of FIG. 1 to raster-scan the surface of the sample by an actuator (not shown), with the surface topography being mapped by motion of the probe assembly 101 in the z-direction.

Figure 2:
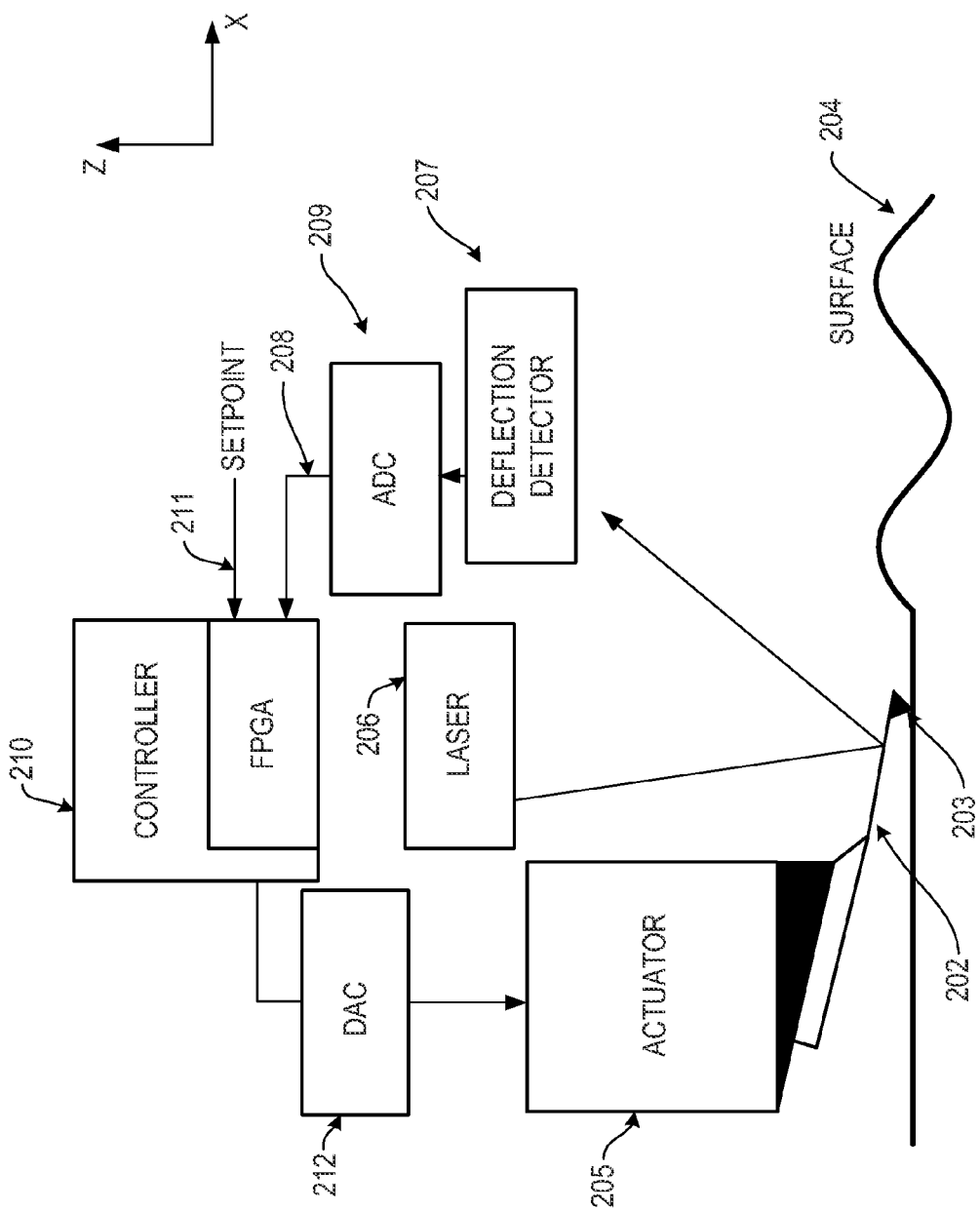
FIG. 2 is a simplified schematic block diagram of an AFM apparatus in accordance with a representative embodiment.

FIG. 2 is a simplified schematic block diagram of an AFM system 200 in accordance with a representative embodiment. The AFM system 200 comprises probe assembly 101, which comprises a cantilever 202 with a probe tip 203 connected thereto. The probe tip 203 contacts a surface 204 of a sample, and an actuator 205 is configured to raise and lower the probe tip 203 in response to contact movement with the surface 204. The probe tip 203 and cantilever 202 may be monolithically formed from a common substrate using known semiconductor processing techniques, and fastened to the actuator 205. Alternatively, the actuator 205, the cantilever 202 and the probe tip 203 may be monolithically formed from a common substrate. In representative embodiments, the probe tip 203 is configured to contact the surface 204 in order to make measurements of the surface topography. As such, AFM system 200 may be referred to as a contact-mode AFM.

The actuator 205 functions to provide motion of the probe tip 203 and cantilever 202 in the ±z-direction of the coordinate system shown in order to maintain a substantially constant force between the probe tip 203 and surface 204 of the sample. In a representative embodiment, the actuator 205 may be an electrostatic "nanostepper" actuator such as described in commonly owned U.S. Pat. No. 5,986,381, dated Nov. 16, 1999, entitled "Electrostatic Actuator with Spatially Alternating Voltage Patterns," to S. Hoen, et al., which is hereby incorporated by reference. Alternatively, the actuator 205 may be a piezoelectric actuator such as described in commonly owned U.S. patent application Ser. No. 12/890, 894, filed on Sep. 27, 2010, entitled "Tandem Piezoelectric Actuator and Single Drive Circuit for Atomic Force Microscopy," to D. Schroeder, et al. The disclosure of this patent application is hereby incorporated by reference.

The AFM system 200 further comprises a laser 206 (or other suitable light source) disposed above the surface 204 of the sample. The laser 206 directs light which is reflected at the cantilever 202 and is incident on a deflection detector 207. The deflection detector 207 provides a deflection signal 208 to an analog to digital converter (ADC) 209, which provides a digitized signal to a controller 210. The deflection signal 208 is indicative of the movement of the probe tip 203 in the z-direction of the coordinate system shown in FIG. 2. In response to the deflection signal 208, the controller 210 provides an output signal 212 to the actuator 205 to raise and lower the cantilever 202 and probe tip 203 to maintain a constant deflection equal to a setpoint deflection 211, leading to a constant force between the probe tip 203 and the surface 204. As described more fully herein, among other functions, the controller 210 is configured to account for resonance conditions that can occur when the cantilever 202 is deflected off the surface 204 ("off-surface resonance conditions"). Generally, the controller 210 and the physical system being controlled (e.g., actuator 205, the cantilever 202 and the probe tip 203) are referred to herein as a control loop.

The controller 210 may be implemented in whole or in part by a processing device, such as a processor or central processing unit (CPU), application specific integrated circuits (ASICs), field-programmable gate arrays (FPGAs), or combinations thereof, using software, firmware, hard-wired logic circuits, or combinations thereof. Details of certain aspects of the functions of the controller 210 are provided below in connection with the representative embodiments. In an embodiment, the controller 210 is implemented on a real-time operating system (OS) used in the AFM system 200 or as a standalone device. When using a processor or CPU, a memory (not shown) is included for storing executable software/firmware and/or executable code that controls the signal from the controller 210 to the actuator 205. The memory may be any number, type and combination of nonvolatile read only memory (ROM) and volatile random access memory (RAM), and may store various types of information, such as computer programs and software algorithms executable by the processor or CPU. The memory may include any number, type and combination of tangible computer readable storage media, such as a disk drive, an electrically programmable read-only memory (EPROM), an electrically erasable and programmable read only memory (EEPROM), a CD, a DVD, universal serial bus (USB) drive, and the like.

Figure 3:
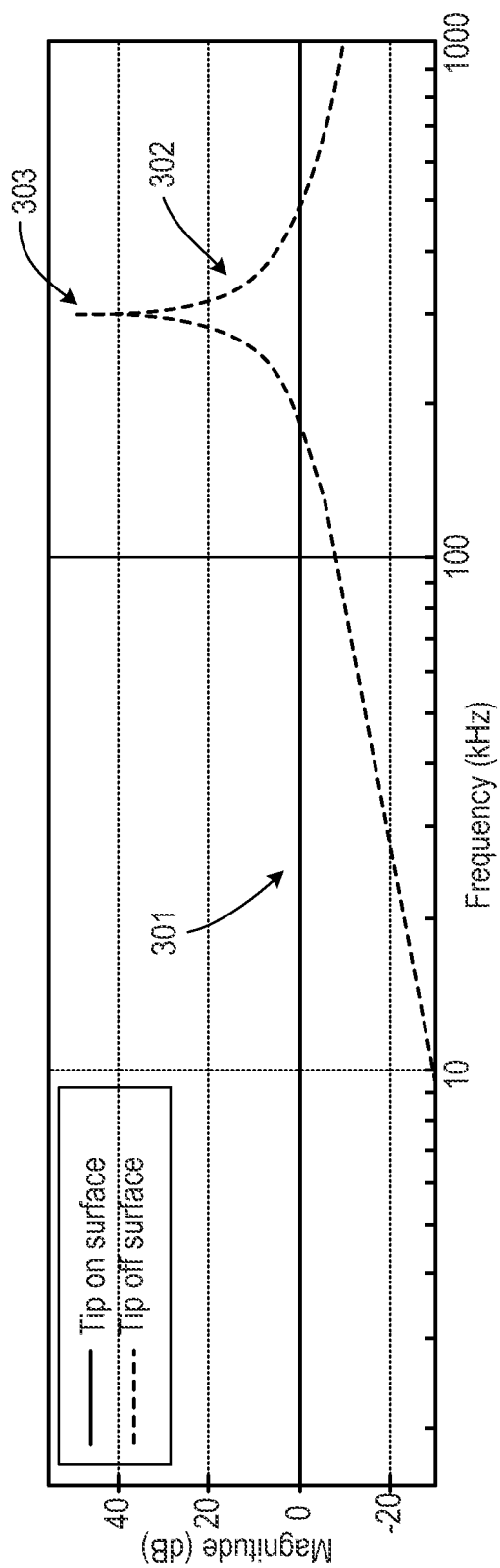
FIG. 3 depicts a model on-surface physical system response and a model off-surface physical system response of a cantilever of an AFM apparatus in accordance with a representative embodiment.

FIG. 3 depicts a model of an on-surface physical system response and a model of an off-surface physical system response of cantilever 202 of AFM 100 in accordance with a representative embodiment. Notably, the model responses used in describing certain aspects of the representative embodiments reveal the essential differences between the on-surface and off-surface physical system response of cantilever 202 as discussed below; in reality, these responses mutually possess additional variations due to structural resonances in other components (e.g., the actuator 205). These resonances are addressed with controller design techniques known to one of ordinary skill in the art and are generally omitted to avoid obscuring the description of the representative embodiments.

Curve 301 depicts the on-surface physical system response of the cantilever 202 as the AFM system 200 scans over a surface of a sample, such as described in connection with the AFM system 200 above. By contrast, curve 302 depicts the off-surface physical system response of the cantilever 202 as the AFM system 200 scans over a surface of a sample, such as described in connection with the AFM system 200 above.

In a representative embodiment, the off-surface physical system response (curve 302) is measured whenever a "new" cantilever is loaded on the AFM system 200 and the laser 206 and deflection detector 207 have been aligned. After the off-surface physical system response (curve 302) is measured, the controller 210 is set to have a comparatively low gain to ensure stability and the probe tip 203 is engaged on the surface. The controller 210 regulates deflection of the cantilever 202, maintaining the deflection at the setpoint. Next, the on-surface physical system response is measured. Finally, and as described in detail below in accordance with a representative embodiment, the controller 210 is designed and coefficients are provided to an FPGA (not shown) of the controller 210 to effect control of the cantilever 202.

When the probe tip 203 is on the surface 204, the cantilever 202 deflects due to changes in surface height or due to motion of the actuator 205. Notably, when the probe tip 203 is pinned to the surface 204 (i.e., in contact with the surface 204 with a force set by the actuator 205), the resonance (vibrational) modes (eigenmodes) of the cantilever 202 are shifted to a comparatively high frequency (beyond the scale of FIG. 3), and can either be ignored or can be compensated by a known controller design technique.

However, when the probe tip 203 becomes free of the surface 204, the cantilever 202 can easily deflect due to oscillations at natural resonance frequencies of the cantilever 202. If the controller 210 has sufficient bandwidth, the control loop can become unstable when the probe tip 203 detaches and sharp vibrational modes may arise. In FIG. 3, for example, the cantilever 202 has a sharp resonance mode represented by peak 303 located at approximately 300 kHz. If left unchecked, this resonance condition can cause instability in the control loop of the AFM system 200 if the probe tip 203 were unexpectedly detached from the surface 204. This off-surface resonance can cause instability in the AFM system 200, which can degrade images of the AFM system 200, and can damage the probe tips and sample surfaces. As will become clearer as the present description continues, mitigation of vibrational off-surface modes of the cantilever 202 by the controller 210 reduces, if not eliminates, imaging errors that can occur if the probe tip 203 temporarily is separated from the surface 204.

Figure 4A:
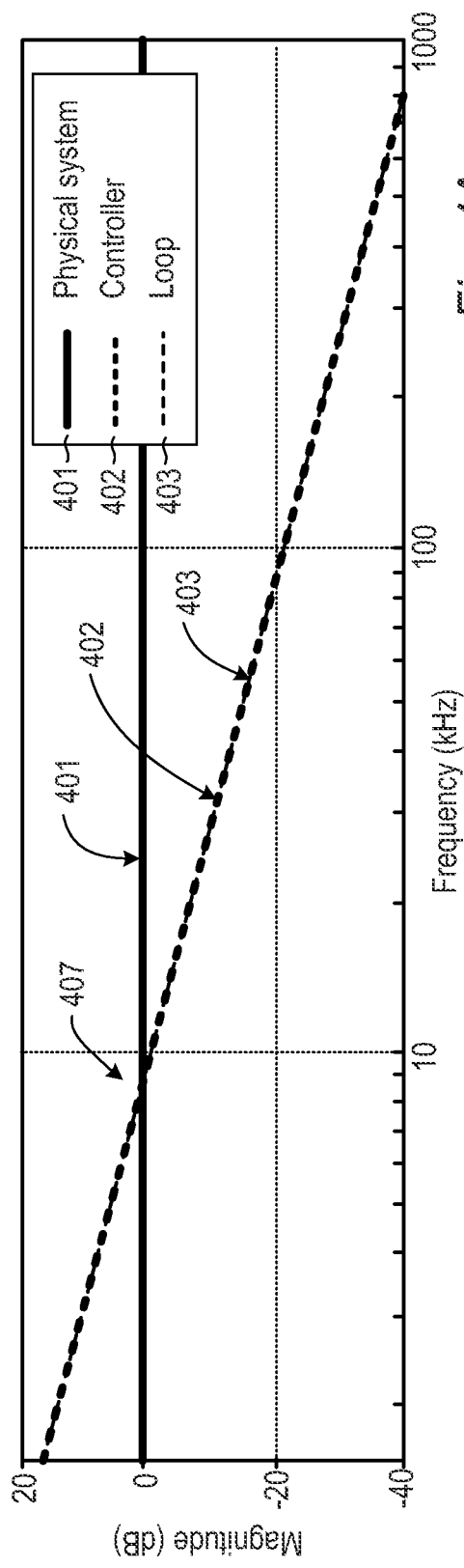
FIG. 4A depicts a controller and on-surface physical system response and loop response before mitigation of off-surface resonance conditions of an AFM apparatus in accordance with a representative embodiment.
Figure 4B:
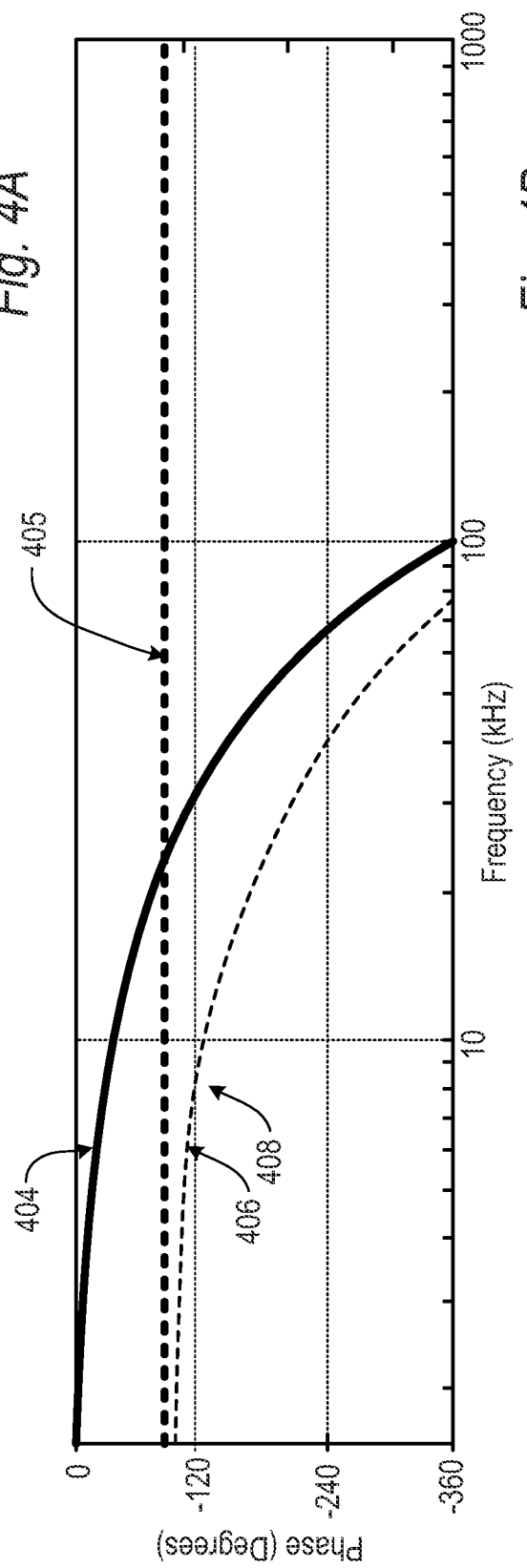
FIG. 4B depicts a phase of a physical system response of an AFM apparatus in accordance with a representative embodiment.

FIG. 4A depicts the magnitude of an on-surface physical system response (curve 401), which is arbitrarily taken to equal 0 dB at all frequencies. FIG. 4B depicts the phase (curve 404) of the on-surface physical system response, which reflects a latency of 10 microseconds representing the total time delay present in the control loop. A controller response magnitude (curve 402) and phase (curve 405) resulting from on-surface tuning of the controller 210 is also shown. In a representative embodiment, the controller 210 comprises an integrator controller known to one of ordinary skill in the art. It is emphasized that the use of an integrator controller is merely illustrative, and that other controllers having differing degrees of complexity are contemplated by the present teachings.

The product of the controller response magnitude (curve 402) and phase (curve 405) and the physical system response magnitude (curve 401) and phase (curve 404) provides a loop response with magnitude (curve 403) and phase (curve 406) over a frequency range of interest. Illustratively, the magnitude of the controller response (curve 402) is tuned to achieve 60° phase margin as indicated by point 407 and point 408. As described more fully below, the initially designed magnitude of the controller response (curve 402) is used to predict the off-surface behavior of the control loop over the frequency range of interest. Any off-surface vibrational resonance modes of the cantilever 202 that would lead to instability can be identified. Then, in accordance with representative embodiments, the magnitude of the controller response (curve 402) of the controller 210 is altered to mitigate the impact of the vibrational resonance modes of the cantilever 202 using, for example, one or more notch filters.

Figure 5:
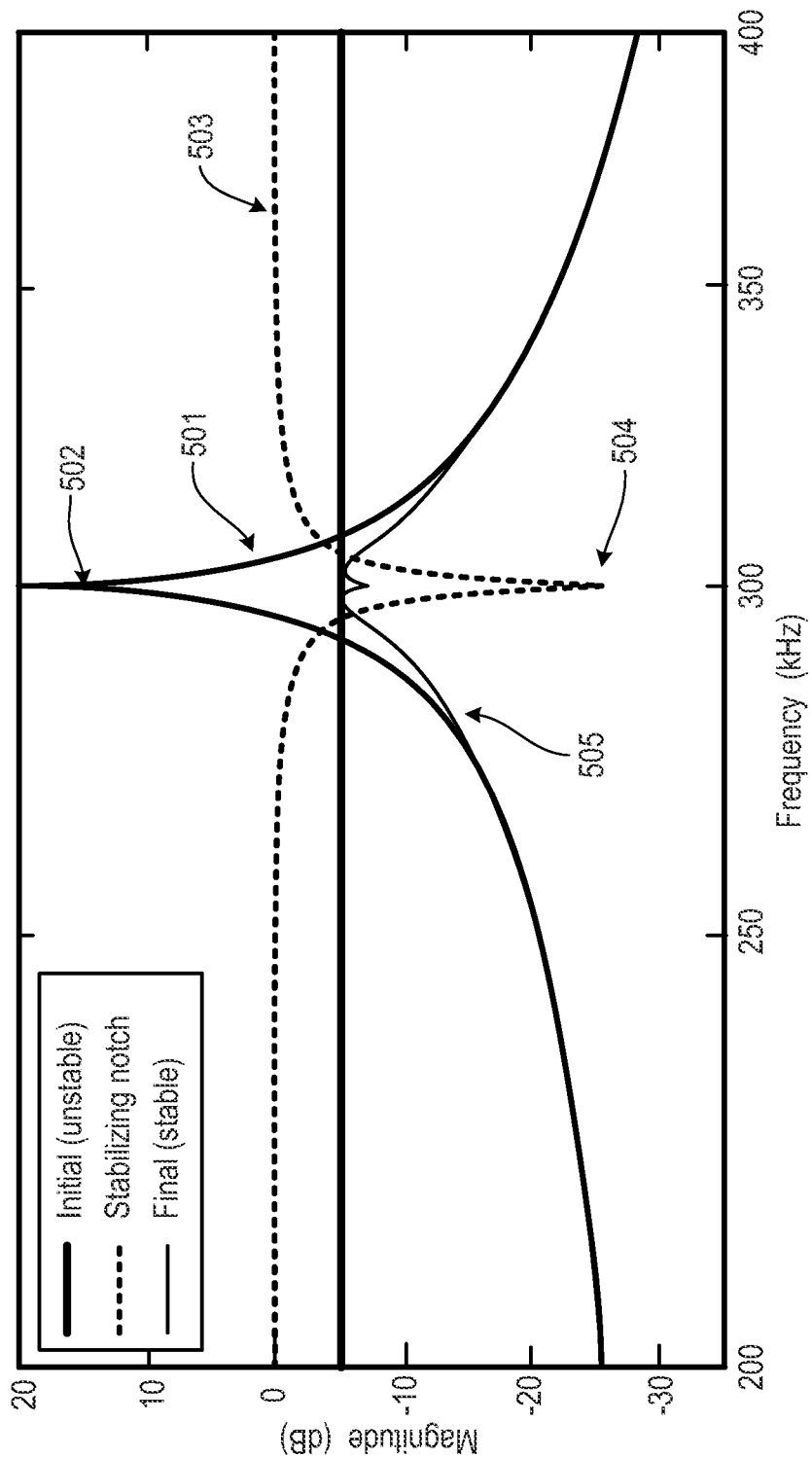
FIG. 5 depicts an off-surface loop-response before and after mitigation of off-surface resonance conditions in accordance with a representative embodiment.

FIG. 5 depicts an off-surface loop-response before and after mitigation of off-surface resonance conditions in accordance with a representative embodiment. Curve 501 depicts the off-surface response of the cantilever 202 determined by the product of the off-surface physical response (curve 302) and the controller response (curve 402). The off-surface loop response is unstable at a vibrational resonance peak 502 of the cantilever 202 at approximately 300 kHz.

Curve 503 depicts the gain versus frequency of a filter designed to mitigate the impact of vibrational resonance peak 502 at 300 kHz. In an illustrative embodiment, the filter is a notch filter designed to reach a minimum gain at point 504 of the curve. The effect of the notch filter is depicted in an off-surface loop response (curve 505). As depicted in FIG. 5, the off-surface loop response (curve 505) is below 0 dB over the frequency range of interest. In representative embodiments, off-surface stability of cantilever 202 is realized by providing an off-surface loop response magnitude below 0 dB over the frequency range of interest.

In representative embodiments, the gain of controller 210 is reduced significantly at each off-surface vibrational resonance peak of the cantilever 202 (e.g., at peak 303). In certain representative embodiments, a filter may be provided in the controller 210 at each resonance peak. Illustratively, the filter provided at each resonance peak is a notch filter. In other embodiments, a low-pass filter (not shown) may be implemented to mitigate the impact of off-surface resonance conditions. In a representative embodiment, the low-pass filter has a cutoff frequency substantially below the frequency of the resonance frequency of the cantilever 202 such that the magnitude of the resonant peak in the off-surface loop response would be reduced to below 0 dB.

Illustratively, the notch filters are tuned to be as narrow and shallow as possible. To this end, a notch filter causes the phase to drop at frequencies below the center frequency of the notch filter (e.g., frequencies less than 300 kHz in the example of FIG. 5). When the on-surface controller is originally designed, the gain is selected to achieve a given phase margin. Adding the notch filter to the controller 210 removes phase and thus, to preserve the phase margin, the overall gain of the controller 210 has to be reduced. This reduces the AFM bandwidth, which is beneficially maximized. The broader (in frequency) and deeper (in reduced gain) that the selected notch filter is, the higher the low-frequency phase penalty will be, and the more reduced the AFM bandwidth will be.

The notch filter could also be fixed notch filter and have a center frequency equal to the free (off-surface) cantilever resonance frequency. The notch filters can be instantiated in software in the controller 210. Alternatively, if the controller 210 is an analog controller, the notch filters for each resonance peak over the frequency range of interest may be provided in a separate circuit (not shown) or with variable resistors and capacitors (not shown).

As noted above, in a representative embodiment, the controller 210 is implemented digitally. In certain embodiments, the controller 210 comprises an FPGA onto which very high speed integrated circuit hardware description language (VHDL) code has been compiled and uploaded. The deflection signal 208 from the deflection detector 207 is digitized by ADC 209. Based on the deflection signal, the FPGA creates output signal 212 that emerges from a digital-to-analog converter (DAC) 213, is amplified, and then provided to the actuator 205. The controller 210 illustratively comprises a proportional-integral-differential (PID) filter block and a series of digital biquadratic filters, known to one of ordinary skill in the art. The PID filters and the digital biquadratic filters of the controller 210 have coefficients useful in establishing the filter characteristics. The coefficients can be dynamically reconfigured to change the filter characteristics, such as by a remote computer (e.g. a computer hosting a graphical user interface for the AFM system 200 and communicating via a communication protocol, such as ethernet). The frequency response of the controller 210 is a function of the filter coefficients, and methods for calculating theoretical frequency responses for digital filters are well-known. Illustratively, the frequency responses of the controller 210 can be calculated using known programming software (e.g., MatLab). For example, a notch filter for use in mitigating off-surface resonances of the cantilever 202 can be specified by a center frequency, a depth, and a width (quality (Q) or damping factor). Known programming software tools (e.g., MatLab) or analytical expressions can be used to convert the desired parameters of the notch filter into biquadratic filter coefficients for the biquadratic filters of the controller 210.

In certain embodiments, rather than fitting the notch filter to data from off-surface measurement, the measured on- and off-surface physical responses can be determined and mathematical models of these physical responses can be made. The controller 210 is analytically designed per the on-surface model. The controller 210 could then be modified to include notch filters derived analytically according to the off-surface equations of the model. Alternately, the off-surface measurement can be incorporated into the on-surface model as a known variance of that model. Known control methods (such as "H-infinity loop shaping") may be implemented for designing control loops that are robust against such variation. Again, this would be performed analytically; a controller would be synthesized in one step. In all embodiments this is predicated on first measuring the off- and on-surface responses and using both sets of information to design controller 210.

The overall gain of controller 210 and the parameters of the notch filter are simultaneously tuned to eliminate the portion of the peak 303 that exceeds the desired gain margin. Adding a notch filter lowers the phase of the controller 210, so the overall gain of controller 210 is decreased in order to preserve the on-surface phase margin. Thus, the gain of the controller 210 and notch parameters of the notch filter are determined by applying a potential notched controller to the on-surface plant and adjusting the overall gain to maintain the on-surface phase margin.

In accordance with a representative embodiment, four variables of the controller 210 are simultaneously optimized: the depth, Q, and center frequency of the notch filter; and the overall gain, which is a scale factor for the controller 210. The optimization is performed by defining a scalar cost function and then using numerical algorithms to find the notch filter parameters that minimize the cost. Beneficially, a cost function is defined that is large if the off-surface loop response exceeds the desired gain margin. One effective cost function returns the least-squares difference between the off-surface loop response and the desired off-surface gain margin. This function is evaluated on the data from the frequency range in which the gain margin was initially exceeded. The distance between the loop response magnitude and the desired margin can first be weighted such that points with insufficient gain margin are penalized (e.g., by a factor of 100). In this manner, a notch filter can be optimized to reduce the magnitude to just below the desired magnitude. Meanwhile, the gain of the controller 210 is adjusted during evaluation of the cost function so that the on-surface phase margin is preserved when the notch filter is added. In summary, the cost function accepts the three notch filter coefficients, calculates the frequency response of the controller containing the corresponding notch filter, decreases the controller gain to preserve the on-surface phase margin, calculates the off-surface loop response containing the notch filter and new gain, and returns the scalar cost value described previously. Using standard algorithms in known software (e.g., a simplex search method performed in e.g. MatLab), the cost function is minimized by varying the notch filter parameters. The resulting optimal notch filter is appended to the filters in the controller 210 along with the new resealed gain. After the excess magnitude has been equalized from one cantilever resonance, the sequence may be repeated to mitigate other off-surface resonance peaks across the off-surface physical response (curve 302) of the cantilever 202, as previously described.

Figure 6:
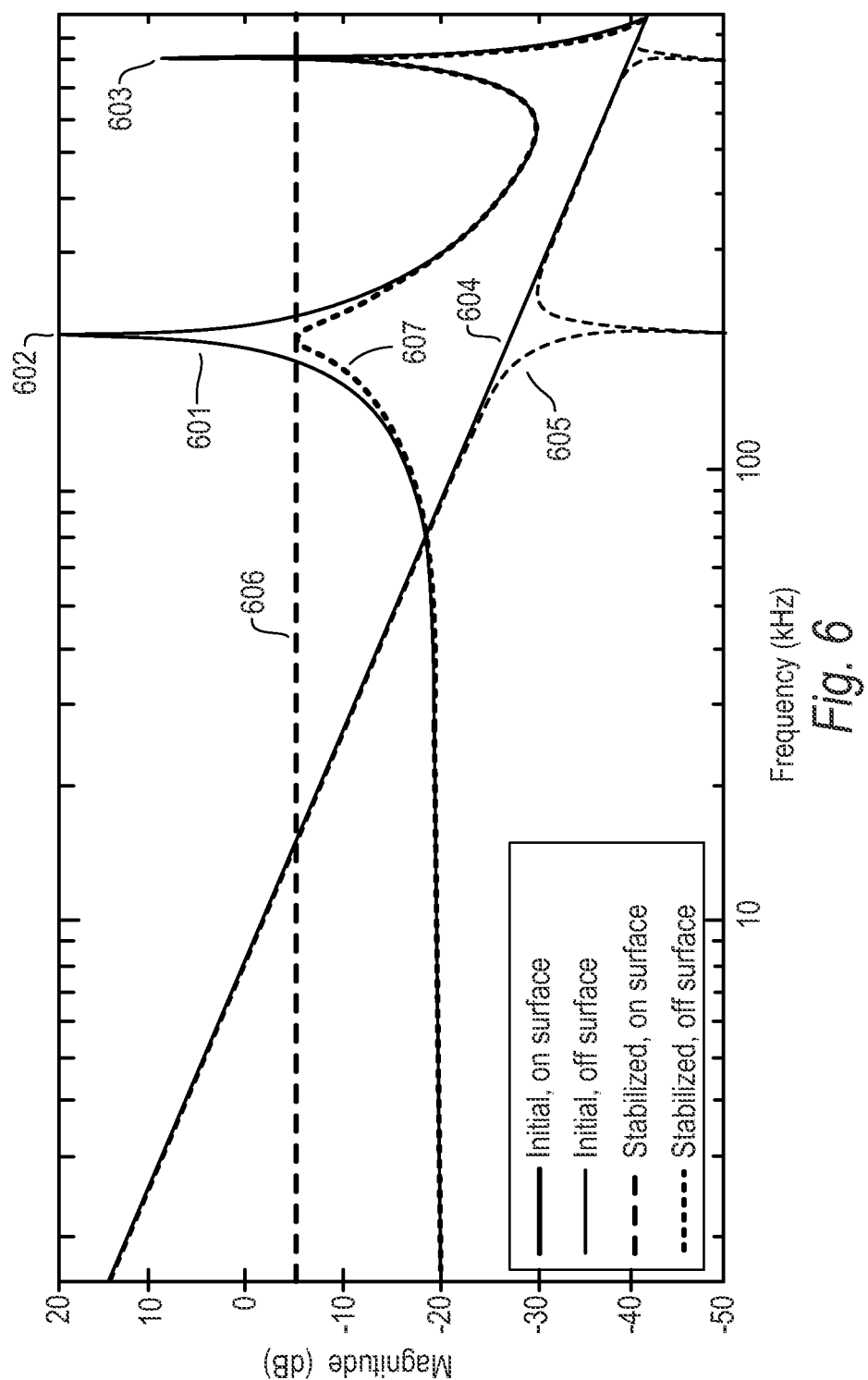
FIG. 6 depicts the off-surface loop response before and after mitigation of off-surface resonance conditions in accordance with a representative embodiment.

In representative embodiments described in connection to this point, the off-surface physical response (curve 302) included a single resonance peak. Of course, more than one resonance peak may exist when the probe tip 203 is off-surface. FIG. 6 depicts an off-surface loop response 601 resulting from more than one off-surface resonance peak (i.e. a peak 602 and a peak 603) over a particular frequency range. In this case, multiple notch filters can be implemented in the controller 210, with each filter having a center frequency (referred to as a "notch") at a respective off-surface resonance peak, transforming the on-surface response function from curve 604 to curve 605. Notably, the frequency range containing the lowest-frequency peak (e.g., peak 602) is addressed first. In certain embodiments, a "safety margin" is effected by providing an off-surface loop response having a magnitude below −5 dB (line 606) over the frequency range of interest. In a manner described above, a first notch filter is provided in the controller 210 to remove the excess gain at the selected resonance peak (e.g., peak 602). Resonance peaks (e.g., peak 603) at other frequencies are identified and respective notch filters are provided with a respective center frequency equal to the identified frequency by repeating the process. This results in an off-surface loop response 607 that fully satisfies the safety margin (line 606). When the notch filters are added to the controller 210, the overall gain of the controller 210 can be resealed as described above.

Figure 7:
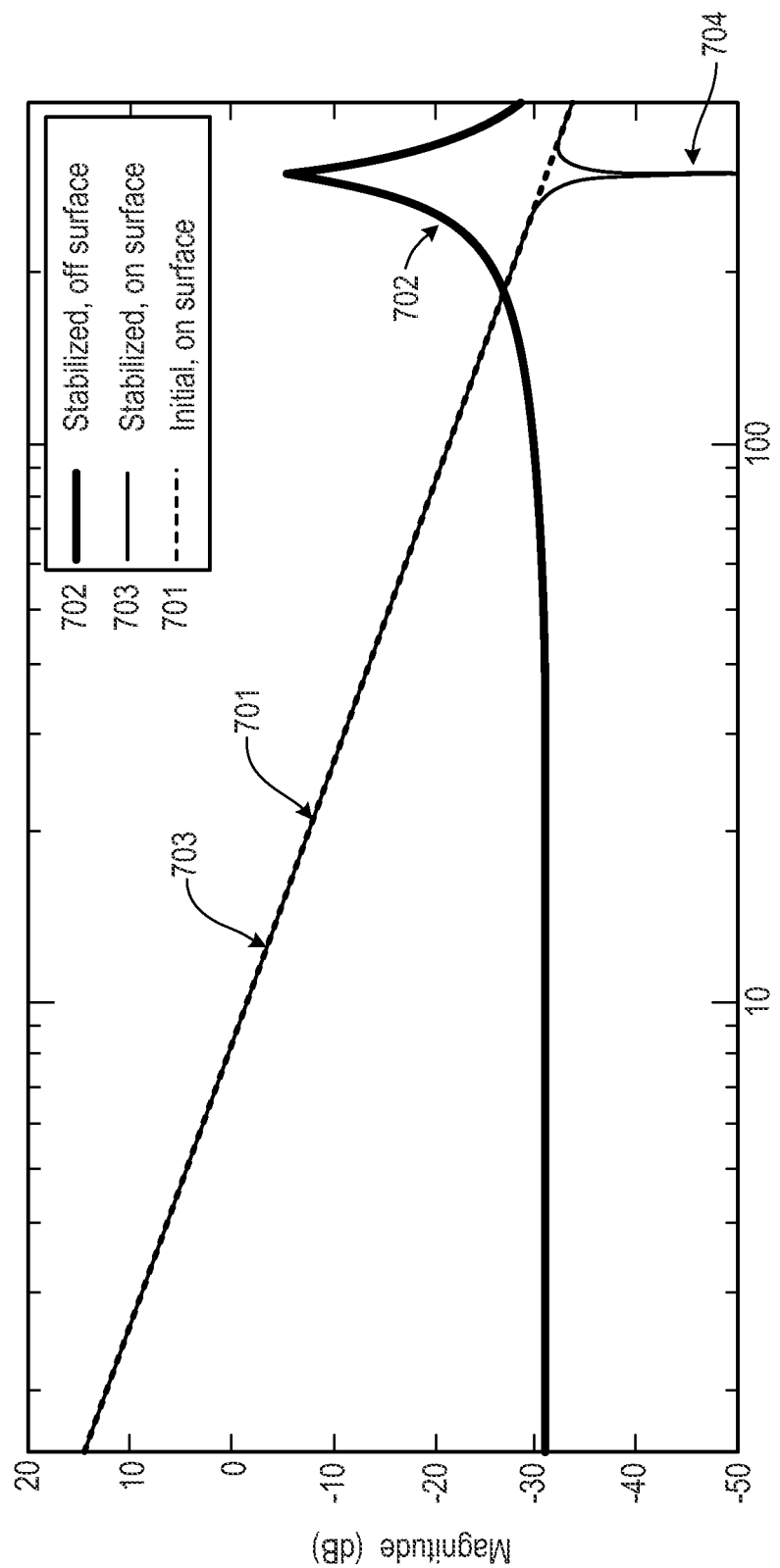
FIG. 7 depicts the loop response of a controller 210 in accordance with a representative embodiment.

FIG. 7 depicts the loop response of a controller 210 in accordance with a representative embodiment. Loop response 701 is generated from the product of the on-surface physical response (curve 401) and the controller response (curve 402). Notably, loop response 701 is the initial on-surface loop response (curve 403). Loop response 702 is generated front the product of the off-surface physical response (curve 302) and the controller response (curve 402) designed according to the process described previously, which contains a notch filter at point 504. Loop response 703 exhibits a significant drop in gain at 300 kHz as depicted at 704 resulting from the notch filter at point 504 of the controller 210. As a result, if the probe tip 203 became detached from the surface 204 during a raster-scan, the loop response 702 would remain stable.

Figure 8:
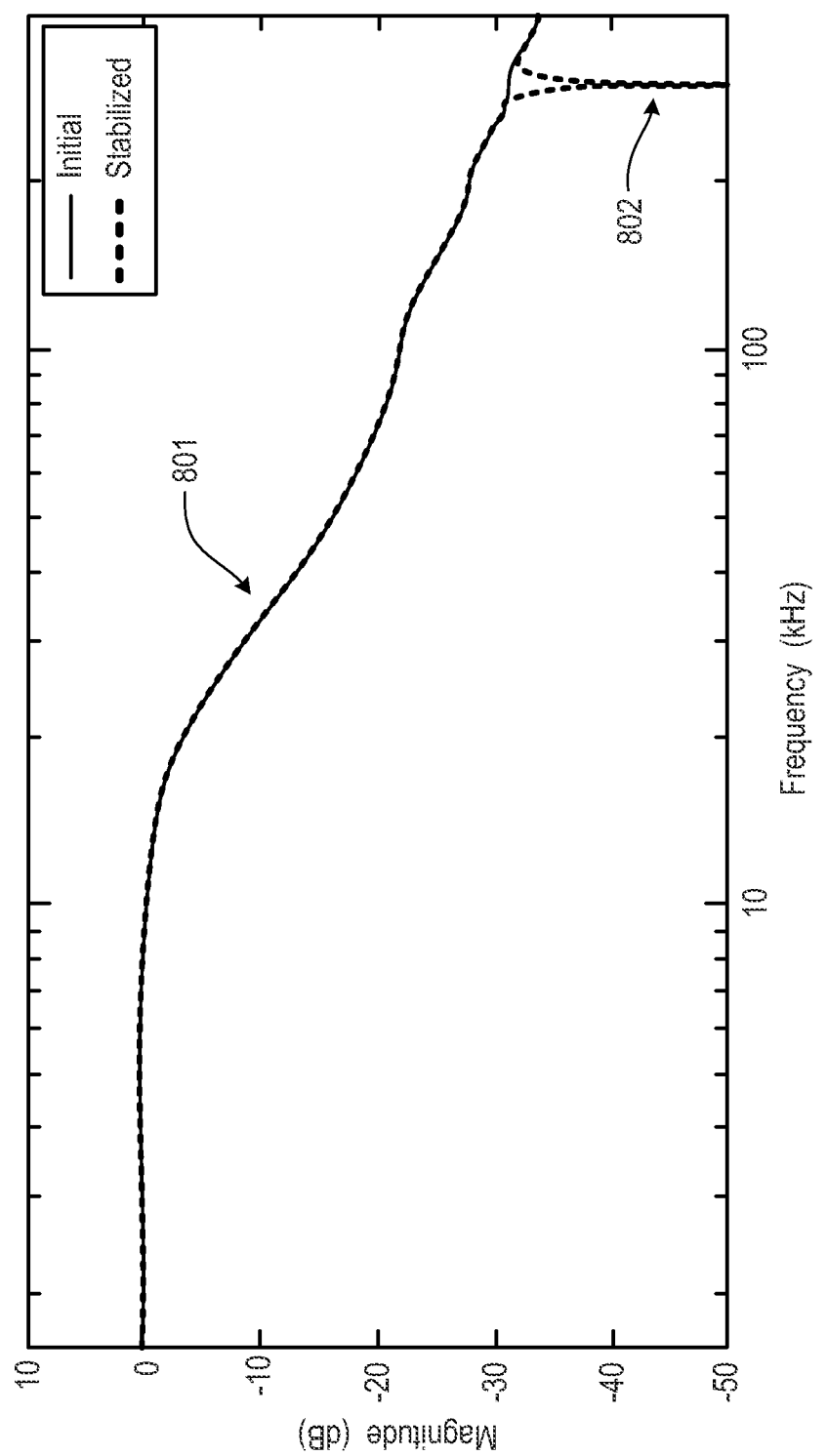
FIG. 8 depicts an image response of an AFM system in accordance with a representative embodiment.

FIG. 8 depicts the image response of the AFM system 200. Curve 801 depicts the on-surface image response without mitigation of resonance peaks to promote stabilization over the depicted frequency range. Curve 802 depicts the stabilized image response. Curves 801 and 802 substantially overlap for frequencies up to approximately 300 kHz in the example depicted. Beneficially, therefore, the incorporation of a notch filter in controller 210 does not impact the image response function aver a frequency range of interest. The bandwidth of the AFM system 200 is determined by a gain of −3 dB. In the present example, the AFM system 200 has a bandwidth of approximately 12 kHz both before and after mitigation of resonance conditions by methods of the representative embodiments.

Figure 9:
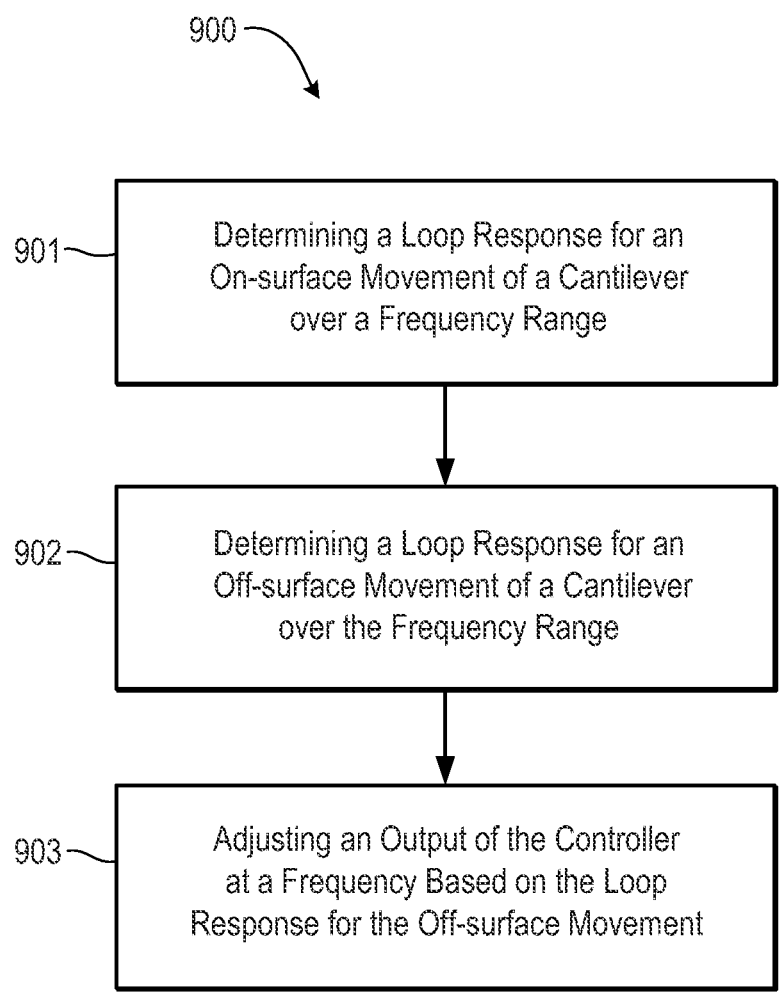
FIG. 9 is a flow-chart of a method in accordance with a representative embodiment.

FIG. 9 is a flow-chart of a method 900 for determining a loop response for an AFM apparatus in accordance with a representative embodiment. The method 900 may be carried out through implementation of the hardware, software and firmware described above. At 901 the method comprises determining a loop response for an on-surface movement of a cantilever over a frequency range. As described above, the loop response for on-surface movement is the product of the on-surface physical system response and the on-surface controller response. As such, the on-surface physical system response and the on-surface controller response are determined before the loop response for on-surface movement is determined. At 902 the method comprises determining a loop response for an off-surface movement of the cantilever over the frequency range. Again, the loop response for on-surface movement is the product of the off-surface physical system response and the off-surface controller response. As such, the off-surface physical system response and the off-surface controller response are determined before the loop response for off-surface movement is determined. At 903 the method comprises adjusting an output of the controller at a frequency based on the loop response for the off-surface movement. It is emphasized that the sequence of performing the method 900 is merely illustrative. Notably, the determining of a loop response for an on-surface movement of a cantilever (901) can be done before or after determining a controller response for an off-surface movement of the cantilever (902).

In view of this disclosure it is noted that the various apparatuses and methods for controlling an AFM can be implemented in variant structures, using variant components and variant methods in keeping with the present teachings. Further, the various components, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A method for determining a loop response for an apparatus for an atomic force microscope, the method comprising:
   determining a loop response for an on-surface movement of a cantilever over a frequency range;
   determining a loop response for an off-surface movement of the cantilever over the frequency range; and
   adjusting an output of the controller at a frequency based on the loop response for the off-surface movement.

2. A method as claimed in claim 1, wherein the determining the loop response for off-surface movement of the cantilever comprises determining a resonance condition for the cantilever.

3. A method as claimed in claim 2, further comprising, after the determining the resonance condition, reducing a gain of the controller at a frequency of the resonance condition.

4. A method as claimed in claim 2, wherein the determining the loop response for the off-surface movement of the cantilever comprises providing a notch filter having a center frequency at the resonance condition.

5. A method as claimed in claim 2, further comprising, after the adjusting, determining a second resonance condition for the cantilever.

6. A method as claimed in claim 5, further comprising, after determining the second resonance condition, providing a second notch filter having a center frequency at the second resonance condition.

7. A computer readable medium having a computer readable program code embodied therein, the computer readable program code adapted to be executed by a computer to implement a method for determining a loop response for an apparatus for an atomic force microscope, the method comprising:
   determining a loop response for an on-surface movement of a cantilever over a frequency range;
   determining a loop response for an off-surface movement of the cantilever over the frequency range; and
   adjusting an output of the controller at a frequency based on the loop response for the off-surface movement.

8. A computer readable medium as claimed in claim 7, wherein the determining the loop response for off-surface movement of the cantilever comprises determining a resonance condition for the cantilever.

9. A computer readable medium as claimed in claim 8, wherein the method further comprises, after the determining the resonance condition, reducing a gain of the controller at a frequency of the resonance condition.

10. A computer readable medium as claimed in claim 8, wherein the determining the loop response for the off-surface movement of the cantilever comprises providing a notch filter having a center frequency at the resonance condition.

11. A computer readable medium as claimed in claim 8, further comprising, after the adjusting, determining a second resonance condition for the cantilever.

12. A computer readable medium as claimed in claim 11, further comprising, after determining the second resonance condition, providing a second notch filter at the resonance condition.

13. An atomic force microscopy (AFM) system, comprising:
- a cantilever;
- a probe tip connected at a first end of the cantilever;
- an actuator connected to a second end of the cantilever; and
- a controller configured to: determine a loop response for an on-surface movement of a cantilever over a frequency range; determine a loop response for an off-surface movement of the cantilever over the frequency range; and adjust an output of the controller at a frequency based on the loop response for the off-surface movement.

14. An AFM system as claimed in claim 13, wherein the actuator is a piezoelectric actuator.

15. An AFM system as claimed in claim 13 wherein the controller determines a resonance condition for the cantilever.

16. An AFM system claimed in claim 15, wherein the resonance condition is an off-surface resonance condition.

17. An AFM as claimed in claim 16, wherein the controller comprises a notch filter at the off-surface resonance condition.

18. An AFM system as claimed in claim 15, wherein the gain is less than zero at the off-surface resonance condition.

* * * * *